US010840770B2

(12) United States Patent
Komura et al.

(10) Patent No.: US 10,840,770 B2
(45) Date of Patent: Nov. 17, 2020

(54) ROTATING ELECTRICAL MACHINE (71) Applicant: DENSO CORPORATION, Kariya (JP)

(72) Inventors: Masatoshi Komura, Kariya (JP); Tomoyuki Shima, Kariya (JP); Yosuke Sekiyama, Kariya (JP); Takuya Kudo, Kariya (JP)

(73) Assignee: DENSO CORPORATION, Kariya (JP)

( * ) Notice: Subject to any disclaimer, the term of this patent is extended or adjusted under 35 U.S.C. 154(b) by 67 days.

(21) Appl. No.: 15/462,404

(22) Filed: Mar. 17, 2017

(65) Prior Publication Data
US 2017/0279337 A1 Sep. 28, 2017

(30) Foreign Application Priority Data
Mar. 22, 2016 (JP) ................................ 2016-056624

(51) Int. Cl.
*H02K 9/02* (2006.01)
*H02K 5/18* (2006.01)

(52) U.S. Cl.
CPC ................ *H02K 9/02* (2013.01); *H02K 5/18* (2013.01)

(58) Field of Classification Search
CPC .. H02K 9/00; H02K 9/02; H02K 9/06; H02K 9/18; H02K 5/00; H02K 5/04; H02K 5/18; H02K 5/20; H02K 5/22; H02K 11/00; H02K 11/04; H02K 11/046; H02K 11/048; H02K 11/33; H02K 7/1025; H02K 16/00
See application file for complete search history.

(56) References Cited

U.S. PATENT DOCUMENTS

| 3,001,121 | A |   | 9/1961  | Kerr, Jr.                     |
|-----------|----|---|---------|-------------------------------|
| 5,043,614 | A |   | 8/1991  | Yockey                        |
| 5,789,833 | A | * | 8/1998  | Kinoshita .............. B61C 9/50 |
|           |    |   |         | 310/64                        |
| 6,018,205 | A | * | 1/2000  | Ohashi .................. H02K 5/18 |
|           |    |   |         | 310/52                        |
| 6,166,904 | A | * | 12/2000 | Kitahara .............. H01L 23/427 |
|           |    |   |         | 257/E23.088                   |
| 6,204,581 | B1 | * | 3/2001  | Lo ....................... H01L 25/072 |
|           |    |   |         | 257/E25.016                   |
| 6,232,683 | B1 | * | 5/2001  | Hirai .................... H02K 5/18 |
|           |    |   |         | 310/59                        |
| 2004/0183385 | A1 | * | 9/2004 | Takahashi ........ H01L 23/3672 |
|           |    |   |         | 310/68 D                      |

(Continued)

FOREIGN PATENT DOCUMENTS

| JP | S55-136842 A | 10/1980 |
|----|--------------|---------|
| JP | S56-083971 U | 7/1981  |

(Continued)

*Primary Examiner* — Tran N Nguyen
(74) *Attorney, Agent, or Firm* — Oliff PLC (57) ABSTRACT

An electrical rotating machine includes a housing which has a bearing mounted on a wall thereof. The housing also has a plurality of air inlets, a plurality of air outlets, and spokes. The spokes extend from the bearing in a radial direction of the housing to isolate the air inlets from each other in a circumferential direction of the housing. Each of the spokes is equipped with a heat sink exposed to a flow of cooling air entering the housing through the air inlet to dissipate heat, as transmitted to the spoke, thereby minimizing transfer of the heat to the bearing through the spokes.

15 Claims, 6 Drawing Sheets

(56) References Cited

U.S. PATENT DOCUMENTS

| | | | | |
|---|---|---|---|---|
| 2007/0046114 A1* | 3/2007 | Kondo | ............... | H01L 25/115 |
| | | | | 310/68 D |
| 2009/0230791 A1* | 9/2009 | Scharfenberg | ....... | H02K 7/1025 |
| | | | | 310/62 |
| 2009/0284087 A1 | 11/2009 | Takahashi et al. | | |
| 2012/0299407 A1* | 11/2012 | Miyama | ............... | H02K 5/18 |
| | | | | 310/63 |
| 2014/0097715 A1* | 4/2014 | Hall | ............... | H02K 5/18 |
| | | | | 310/59 |
| 2014/0292163 A1* | 10/2014 | Lau | ............... | H02K 9/06 |
| | | | | 310/60 R |
| 2015/0137633 A1* | 5/2015 | Akiyoshi | ............... | H02K 9/06 |
| | | | | 310/62 |

FOREIGN PATENT DOCUMENTS

| | | |
|---|---|---|
| JP | H02-026250 A | 1/1990 |
| JP | H09-154262 A | 6/1997 |

* cited by examiner

ROTATING ELECTRICAL MACHINE

CROSS REFERENCE TO RELATED DOCUMENT

The present application claims the benefit of priority of Japanese Patent Application No. 2016-56624 filed on Mar. 22, 2016, the disclosure of which is incorporated herein by reference.

BACKGROUND

1. Technical Field

The invention relates generally to a rotating electrical machine.

2. Background Art

There is an increasing need for powering up a rotating electrical machine for vehicles. Increasing an output power of the rotating electrical machine to meet such a need will result in an increase in amount of heat generated by the rotating electrical machine. In order to alleviate such a problem, improvement in cooling ability of the rotating electrical machine is being sought.

The improvement of cooling ability of a cooling fan is being studied for enhancing the cooling ability of the rotating electrical machine. The cooling fan is secured to a rotating shaft of the rotating electrical machine so that it rotates following rotation of the rotating shaft. The enhancement of the cooling ability of the cooling fan, however, gives rise to a problem that mechanical noise which arises from the rotation of the cooling fan increases.

In order to alleviate the above problem, Japanese Patent No. 3983426 teaches an AC generator (i.e., a rotating electrical machine) which has an improved cooling ability. Specifically, the AC generator is equipped with heat dissipating fins disposed on an outer periphery of a bearing box in which a bearing is mounted to rotatably hold a rotating shaft of the AC generator.

Conventional electrical rotating machines are usually constructed so that heat, as generated by a stator where the amount of heat generation is the highest, is transmitted to the bearing box through a case or housing and then cooled. This structure, however, faces a problem that an increase in quantity of heat generated by the stator which results from the powering up of the electrical rotating machine requires the need for fine arrangement of the heat dissipating fins in order to increase a surface area of the heat dissipating fins. The increase in surface area of the heat dissipating fins, however, results in an increase in resistance to a flow of air (i.e., cooling air) passing the heat dissipating fins, which may lead to a deterioration in cooling effects on the electrical rotating machine.

Some conventional electrical rotating machines have a case connected to a negative pole of an external power supply. This structure enables an electrical device such as a rectifier to be secured to the case. This, however, causes the electrical device to generate heat during operation of the electrical rotating machine, thereby resulting in an increase in amount of heat conducting through the case. Further improvement of the cooling ability is, therefore, sought.

Particularly, an increase in amount of heat transferring through the case will cause the heat to be transmitted from the case to the rotating shaft or the bearing of the electrical rotating machine, so that the temperature thereof rises, which also requires the improvement of the cooling ability of the electrical rotating machine.

SUMMARY

It is therefore an object to provide an electrical rotating machine which is designed to have an enhanced heat dissipating ability.

According to one aspect of the invention, there is provided an electrical rotating machine which comprises: (a) a rotor which has a rotor winding and creates magnetic poles upon energization thereof; (b) a stator which is disposed to face the rotor; (c) a housing which retains the rotor and the stator therein; (d) a bearing through which the rotor is retained by the housing to be rotatable; (e) a plurality of air inlets which are formed in a wall of the housing and through which cooling air enters the housing; (f) a plurality of air outlets which are formed in the wall of the housing and through which the cooling air is drained outside the housing; (g) spokes which extend in a radial direction of the housing to define the air inlets in the wall of the housing and isolate the air inlets from each other in a circumferential direction of the housing; and (h) heat sinks each of which is equipped with fins. Each of the heat sinks is disposed on a respective one of the spokes.

The electrical rotating machine, as described above, has the air inlets through which cooling air enters the housing and which is formed in the housing to cool the bearing. The spokes extend to isolate the air inlets from each other in the circumferential direction of the housing. When the stator which is located outside the spokes in the radial direction of the housing generates heat, it will cause the heat to transfer through thermal transfer paths, as defined by the spokes, to the bearing. Each of the spokes has disposed thereon one of the heat sinks each of which is equipped with the fins exposed to the air inlet, thereby achieving heat dissipation in the air inlet. In other words, the fins are exposed to a flow of cooling air entering the air inlet, thereby dissipating the from the spoke to minimize transmission of the heat to the bearing.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below in detail. The embodiments refer, as an example, to an electrical rotating machine mounted in vehicles such as automobiles.

First Embodiment

Figure 1:
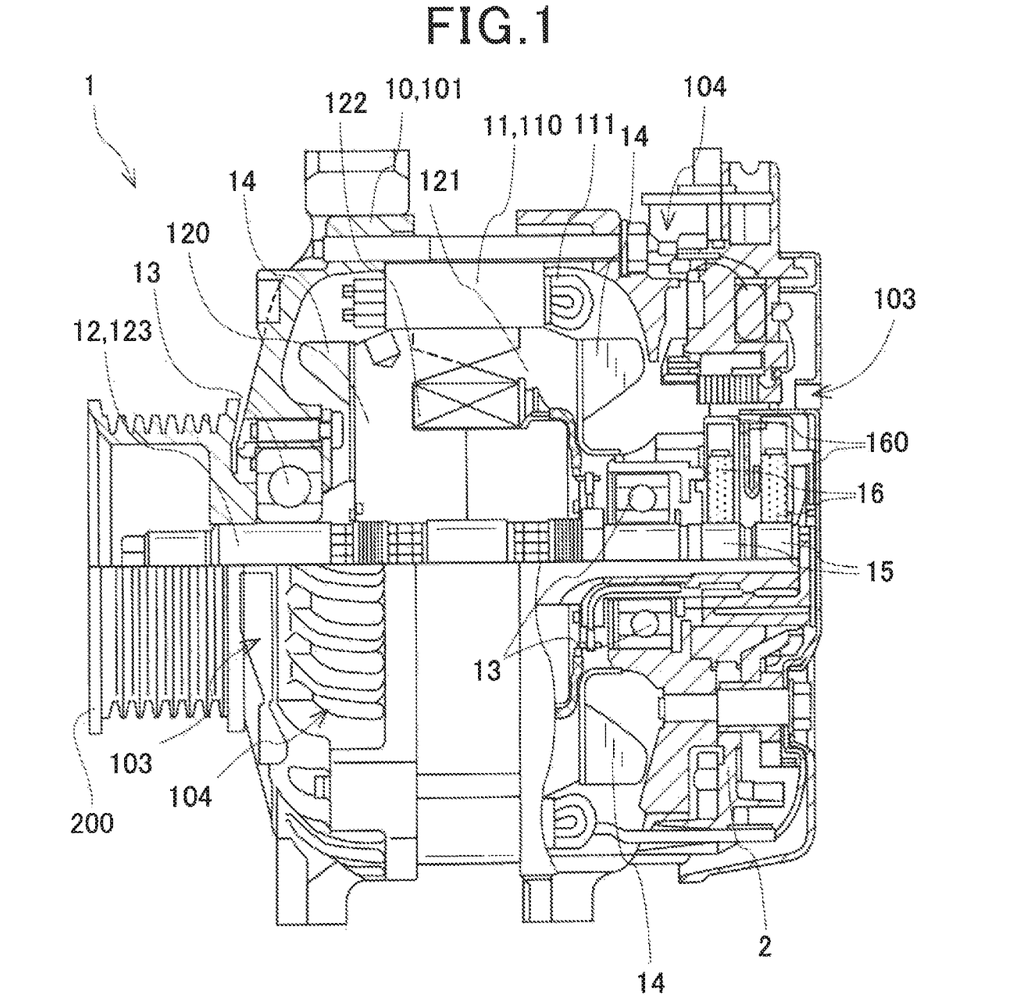
FIG. 1 is an axially sectional view of an electrical rotating machine according to the first embodiment.
Figure 2:
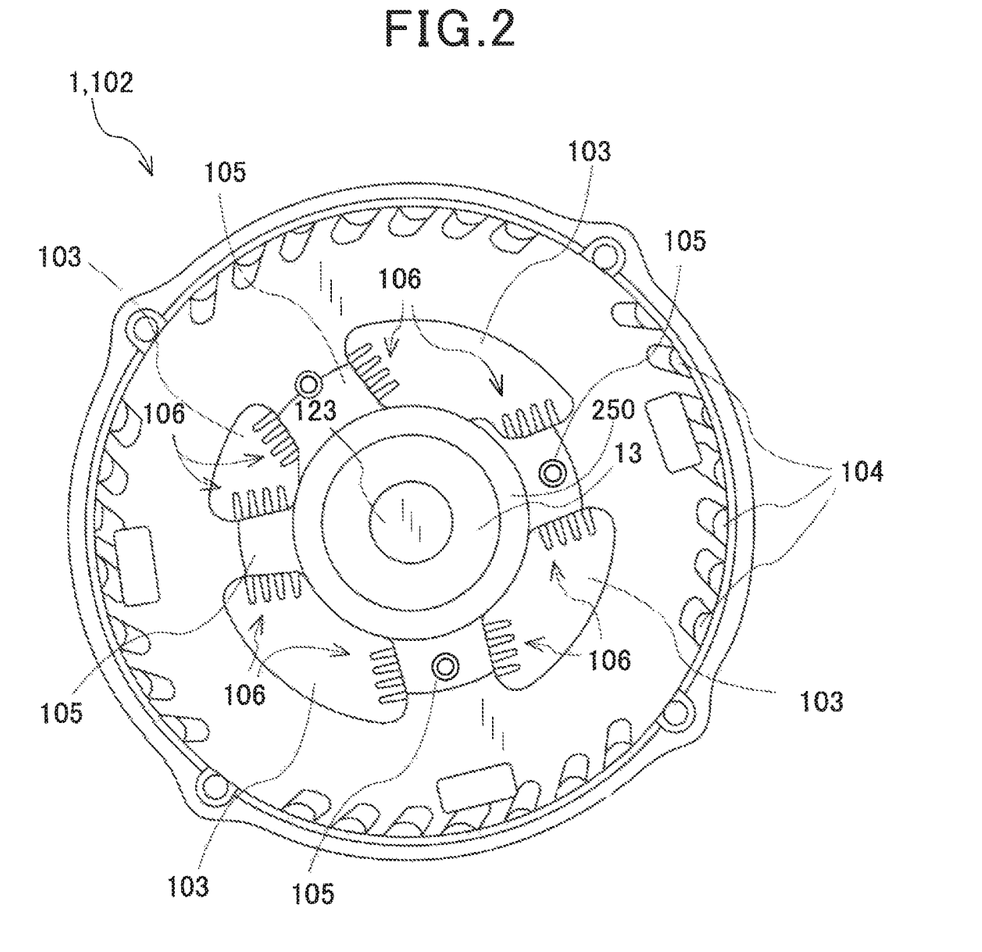
FIG. 2 is a side view which illustrates a structure of a housing of the electrical rotating machine of FIG. 1.

FIGS. 1 and 2 illustrate the electrical rotating machine 1 with a built-in controller according to the first embodiment. FIG. 1 is a cross section of the electrical rotating machine 1.

The electrical rotating machine 1 is mounted in an automotive vehicle and supplied with electric power from a battery to work as an electric motor which produces a drive force to move the vehicle. The electric rotating machine 1 is also supplied with a drive force (i.e., torque) generated by an engine mounted in the vehicle to work as an electrical generator to produce electric power to charge the battery. The electrical rotating machine 1 is equipped with the controller 2.

The electrical rotating machine 1 is also equipped with the housing 10, the stator 11, the rotor 12, the cooling fans 14, the slip rings 15, and the brushes 16.

The housing 10 has disposed therein the stator 11 and the rotor 12 which face each other and serves as a support which retains the rotor 12 (i.e., the rotating shaft 123) through the bearings 13 to be rotatable. The housing 10 also has the controller 2 retained therein. The housing 10 also has formed therein the air inlets 103 into which cooling air enters and the air outlets 104 from which the cooling air is discharged.

The housing 10 is made up of the front housing 101 and the rear housing 102. The front housing 101 and the rear housing 102 are, as clearly illustrated in FIG. 1, of a hollow cylindrical shaped with a bottom and assembled with openings secured to each other. The rotating shaft 123 passes through the bottoms of the front housing 101 and the rear housing 102.

Specifically, each of the front housing 101 and the rear housing 102 has a plurality of air inlets 103 formed in the bottom thereof (i.e., a side wall, as viewed in FIG. 1) and a plurality of air outlets 104 formed in a side wall thereof (i.e., a peripheral wall of the housing 10). FIG. 2 illustrates the layout of the air inlets 103 and the air outlets 104 formed in the rear housing 102, as viewed from the left side (i.e., the bottom of the rear housing 102) along the axial direction of the electrical rotating machine 1 in FIG. 1.

The air inlets 103 are, as can be seen in FIG. 2, defined by four openings formed outside the rotating shaft 123 in the radial direction of the rotating shaft 123 and arranged away from each other in the circumferential direction of the rotating shaft 123. Specifically, the housing 10 (i.e., the rear housing 102) has the hollow cylindrical bearing housing 250 which is formed on the bottom wall thereof and in which the bearing 13 is fit. The housing 10 (i.e., the rear housing 102) also has the spokes 105 integrally continuing from the outer periphery of the bearing housing 205 in the radial direction of the housing 10. In other words, the spokes 105 each extend from the bearing 13 in physical and thermal contact therewith. The air inlets 103 are isolated from each other by the spokes 105 which extend from the bearing 13 (more specifically, the bearing housing 250 of the housing 10) in the radial direction of the electrical rotating machine 1. In other words, the spokes 105 defines the air inlets 103 in the bottom wall of the housing 10 and isolates the air inlets 103 from each other in the circumferential direction of the housing 10.

Each of the spokes 105, as illustrated in FIG. 2, has the heat sinks 106 disposed thereon. The heat sinks 106 are not formed unintentionally in a production process of the electrical rotating machine 1, but geometrically shaped to have a predesigned form. For instance, each of the heat sinks 106 has a height of at least 1 mm or more. Each of the heat sinks 106 has major surfaces which extend parallel to the axis of the rotating shaft 123 and perpendicular to the length of the spoke 105. The heat sinks 106 are, as clearly illustrated in FIG. 2, disposed in the respective air inlets 103. Each of the heat sinks 106 has a plurality of straight fins 106A to 106D which are arranged away from each other along the bottom surface of the rear housing 102 (i.e., in a direction perpendicular to the axis of the rotating shaft 123, in other words, a direction in which the spokes 105 extend). The fins 106A to 106D protrude from the respective spokes 105 and have the same length (i.e., height) perpendicular to the length of the spokes 105. Each of the fins 106A to 106D has opposed major surfaces extending substantially parallel to the axial direction of the housing 10 (i.e., the rotor 12), i.e., a flow of cooling air entering a corresponding one of the air inlets 103. The fins 106A to 106D are exposed directly to the flow of cooling air entering the air inlets 103. Each of the fins 106A to 106D extends straight from the spoke 105, but may alternatively be shaped to have a curved form. Each of the fins 106A to 106D have a thickness which is substantially constant in a direction in which the fins 106A to 106D extend from the spokes 105, but may alternatively be designed to taper toward the head thereof. Each of the fins 106A to 106D may also be designed to have a rectangular or a circular cross section or a glob shape with a head tapering toward the upstream or downstream side of a flow of cooling air (i.e., an onion shape). Each of the fins 106A to 106D may alternatively have a cross section which is curved in a shape of a louver which works to a flow guide to fix the direction of flow of the cooling air.

The air inlets 103 are formed by openings located close to the bearing 13 in order to facilitate flow of the cooling air to the bearing 13. The air outlets 104 are, as illustrated in FIG. 2, slit-like openings formed in the side wall of each of the front and rear housings 101 and 102.

The stator 11 includes the stator core 110 and the stator winding 111. The stator winding 111 is made of a three or more phase winding and has sections disposed in slots formed in the stator core 110. The stator core 110 is made of a stack of a plurality of magnetic steel plates in order to avoid generation of eddy current to reduce iron loss. The stator 11 faces the rotor 12 (which will be described later in detail) at a given interval away from each other. The interval between the stator 11 and the rotor 12 is selected so that a magnetic flux will flow between the stator 11 and the rotor 12 and to eliminate a risk of physical damage arising from contact therebetween.

The rotor 12 includes a pair of rotor cores 120 and 121, the rotor winding 122, and the rotating shaft 123.

The rotor cores 120 and 121 are made from magnetic material and opposed to each other in an axial direction of the rotor 12. Each of the rotor cores 120 and 121 is formed by a one-piece body and has a plurality of claw-shaped magnetic poles (not shown). Each of the rotor cores 120 and 121 may be partially made of, like the stator core 110, a stack of steel plates. The claw-shaped magnetic poles of each of the rotor cores 120 and 121 are arranged in a circumferential direction of the rotor 12 near the stator core 110 and each shaped to taper at a given rate in the axial direction of the rotor 12.

The rotor cores 120 and 121 may be shaped, as can be seen in FIG. 1, to have L-shaped cross sections which define the respective claw-shaped magnetic poles and also have a circular body other than the claw-shaped magnetic poles. The claw-shaped magnetic poles may alternatively be formed to have a J-shaped or a U-shaped cross section. The circular body may be of an annular shape, a disc shape, or a hollow cylindrical shape. The claw-shaped magnetic poles of the rotor core 120 face the claw-shaped magnetic poles of the rotor core 121 in misalignment so that they mesh with each other. Each of the rotor cores 120 and 121 is made of magnetic material at least including the claw-shaped magnetic poles.

The rotor winding 122 is disposed between the rotor core 120 and the rotor core 121. When the rotor winding 122 is electrically energized, it will cause the claw-shaped magnetic poles of the rotor core 120 and the claw-shaped magnetic poles of the rotor core 121 to be magnetized to have N-poles and S-poles, respectively.

The rotating shaft 123 is assembled with the rotor cores 120 and 121. The rotating shaft 123 is rotatably retained by the bearings 13 inside the housing 10. The rotating shaft 123 rotates together with the rotor 12.

The rotating shaft 123 has a first end portion (i.e., the left side in FIG. 1) on which the pulley 200 is, as clearly illustrated in FIG. 1, mounted through a fastener and a second end portion (i.e. the right side in FIG. 1) on which the slip rings 15 are fit. For instance, a transmission belt is wound around the pulley 200 to transmit torque from a rotating shaft of the internal combustion engine mounted in the vehicle to the pulley 200, so that drive power is transmitted between the electrical rotating machine 1 and the internal combustion engine.

The bearings 13 retain the rotating shaft 123 to be rotatable. The bearings 13 work as a mechanical part to rotatably support the rotating shaft 123 and may be implemented by ball or rolling bearings or sliding bearings. Each of the bearings 13 of this embodiment is made up of an outer race, an inner race, rollers, and a retainer. The outer race is secured to the housing 10. The inner race is fit on the rotating shaft 123.

The cooling fans 14 are secured to axially opposed ends of the rotor 12 near the stator winding 111. When the cooling fans 14 are rotated by rotation of the rotor 12, it will cause cooling air to be sucked into the housing 10 through the air inlets 103 and also to be discharged from the air outlets 104. The cooling air flows inside the housing 10, thereby the electrical rotating machine 1 including the cooling the bearings 13 and the stator 11.

The slip rings 15 are electrically connected to the rotor winding 122 through conductors. The slip rings 15 are placed in contact with the brushes 16 to achieve transmission of electric power or signals therebetween.

The brushes 16 are disposed in the respective brush holders 160. The brush holders 160 are each made of an electrically insulating member in which the brush 16 is held. The brush holders 160 have terminals connected to the rotor winding 122 and a regulator for transmission of electric power or signals therebetween. The brushes 16 serve as positive and negative poles, respectively.

The controller 2 works to control on- and off-operations of the electrical rotating machine 1. The controller 2 includes an electrical power converter and the regulator.

The electrical power converter connects windings of the electrical rotating machine 1 (i.e., the stator winding 111 and the rotor winding 122) to an external power supply to achieve conversion and transmission of electric power therebetween. Specifically, when the electrical rotating machine 1 is in a motor mode, the power supply works as a dc power supply to deliver an electrical power to the windings of the electrical rotating machine 1 through the electrical power converter. When the electrical rotating machine 1 is in a regenerative mode, the windings of the electrical rotating machine 1 work to deliver an electric power to the power supply through the electrical power converter.

The electrical power converter is not limited to the above structure and may be implemented by a typical converter(s) used in conventional electrical rotating machines. For instance, a plurality of (e.g., two or three) electrical power converters may be arranged circumferentially around an outer periphery of the rotating shaft 123 and connected together so as to achieve transmission of electric power or signals between adjacent two of the electrical power converters.

The regulator works to regulate field current to the rotor winding 122 based on information, as sent from an external device. The regulator may be connected to control terminals of switching devices installed in the controller 2 (e.g., the electric power converter), so that the external device may work to control the rotation or stop of the electrical rotating machine 1. The regulator may be connected or not connected to the electrical power converter.

The external device works to deliver a flow of electric current to the stator winding 111 and the rotor winding 122 to control the rotation of the electrical rotating machine 1 or supply electric power, as generated by the stator winding 111, to charge the dc power supply. The external device includes an arithmetic unit such as an ECU (Electronic Control Unit) or a computer. The external device may be installed either inside or outside the electrical rotating machine 1.

The dc power supply includes at least one of a fuel cell, a solar cell, a lithium-ion cell, and a lead-acid storage battery. The fuel cell and the solar cell serve as a primary battery which output a dc power. The lithium-ion cell and the lead-acid storage battery serve as a secondary battery which can be selectively charged, discharged into a load, and recharged many times. In this embodiment, the dc power supply is preferably implemented by the lithium-ion cell or the lead-acid storage battery in order to operate the electrical rotating machine 1 selectively in the motor mode and the regenerative mode.

The electrical rotating machine of this embodiment offers the following beneficial advantages.

Advantage 1

The electrical rotating machine 1 of this embodiment has the rotor 12 retained by the housing 10 through the bearings 13 to be rotatable. The housing 10 has formed therein the air inlets 103 through which the cooling air enters to absorb heat from the bearing 13 and the air outlets 104 from which the cooling air, as having cooled the bearings 13, is drained. The housing 10 also has the spokes 105 which extend in the radial direction of the housing 10 to define the air inlets 103 which are arranged away from each other in the circumferential direction of the housing 10. The housing 10 also has the heat sinks 106 each of which is equipped with the fins 106A, 106B, 106C, and 106D which extend parallel to the axial direction of the housing 10, that is, perpendicular to a direction in which the spokes 105 radially extend. In other words, each of the fins 106A to 106D has the opposed major surfaces extending substantially parallel to a flow of the cooling air entering a corresponding one of the air inlets 104, thus causing the cooling air to pass through the fins 106A to 106D while being subjected to a less flow resistance.

In the above structure of the electrical rotating machine 1, the heat absorption occurs in the openings of the air inlets 103 (i.e., the heat sinks 106) through which the cooling air enters the housing 10. The cooling air enters the housing 10 with a less flow resistance to effectively cool a heat transmission path in the housing 10. This results in a decreased amount of heat transmitted to the bearings 13 through the housing 10 (i.e., the spokes 105). This ensures the stability in operation of the electrical rotating machine 1.

Specifically, when the electrical rotating machine 1 is actuated in the motor mode or regenerative mode, the current will flow through the windings (i.e., the stator winding 111 and the rotor winding 122) of the electrical rotating machine 1. The stator 11 facing the rotor 12 has the stator winding 111 which is usually denser than the rotor winding 122. Therefore, when the current flows through the stator winding 111 of the stator 11, it will cause a greater quantity of heat to be generated by the stator winding 111. The heat is then transmitted from the stator 11 to the side walls of the front housing 101 and the rear housing 102 and spreads in the axial direction of the housing 10.

After transferring the side wall (i.e., the peripheral wall) of the housing 10 and then reaching the bottom walls of the front housing 101 and the rear housing 102, the heat radially transfers through the bottom walls, in other words, travels inward toward the rotating shaft 123 through the spokes 105.

The electrical rotating machine 1, as described already, has disposed thereon the heat sinks 106 extending into the air inlets 103. The heat, as having transferred to the spokes 105, is therefore absorbed through the heat sinks 106 by the cooling air flowing into the housing 10 through the air inlets 103, thereby resulting in a decreased quantity of heat transmitted from the housing 10 to the rotating shaft 123 to thermally protect the rotating shaft 123 and the bearing 13.

The electrical rotating machine 1 of this embodiment, as apparent from the above discussion, has an enhanced heat dissipation ability.

Advantage 2

The electrical rotating machine 1 of this embodiment has the heat sinks 106 each of which is equipped with the fins 106A, 106B, 106C, and 106D extending from the spoke 105 perpendicular to the axis of the housing 10. Each of the fins 106A to 106D has major surfaces extending substantially parallel to a flow of the cooling air passing through the air inlet 103.

In other words, the fins 106A to 106D of the heat sinks 106 extend in the air inlets 103, so that the heat dissipates from the heat sinks 106 to the cooling air passing through the air inlets 103 into the housing 10. This results in a decreased quantity of heat transferring from the housing 10 to the rotating shaft 123 through the bearings 13 and also minimizes a thermally increased length of the housing 10.

Second Embodiment

Figure 3:
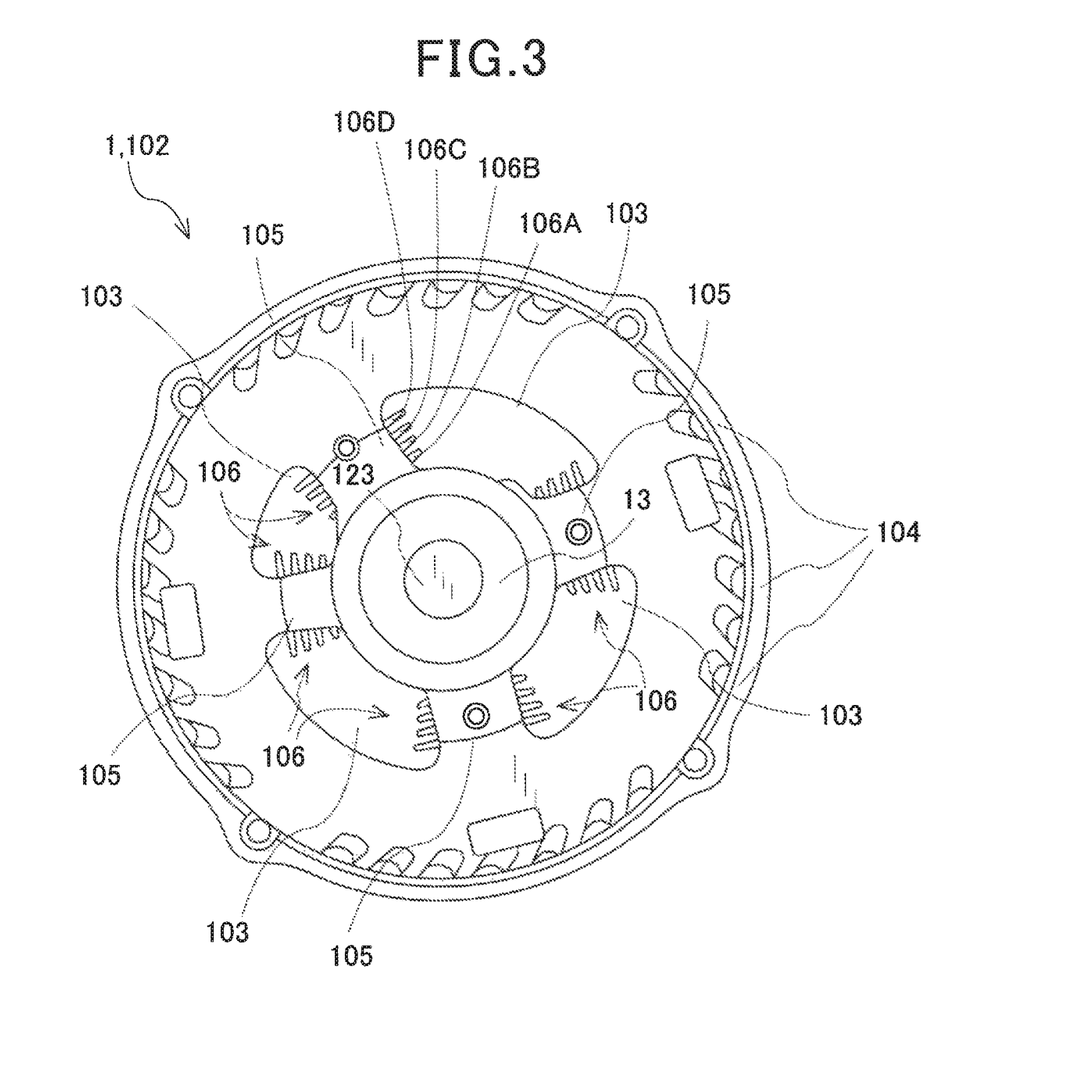
FIG. 3 is a side view which illustrates a structure of a housing of an electrical rotating machine according to the second embodiment.

The electrical rotating machine 1 of the second embodiment is different only in structure of the heat sinks 106 from the one in the first embodiment. Other arrangements are identical, and explanation thereof in detail will be omitted here. FIG. 3 is a side view which illustrates the heat sinks 106 of the electrical rotating machine 1 in the second embodiment.

Each of the heat sinks 106 has the fins 106A, 106B, 106C, and 106D which are, as can be seen in FIG. 3, different from each other in height thereof, i.e., a distance between the tip of each of the fins 106A to 106c and the outer periphery of the spoke 105, in other words, a distance by which each of the fins 106A to 106D extend from the spoke 105. In this embodiment, the height increases stepwisely from the fin 106A which is located innermost in the radial direction of the housing 10 to the fin 106D which is located outermost side in the radial direction of the housing 10.

Beneficial Advantages of the Second Embodiment

The structure of the electrical rotating machine 1 offers the following advantage 3 in addition to the advantages 1 and 2, as described above.

Advantage 3

The electrical rotating machine 1, as described above, has the fins 106A to 106d which are different in height from each other. An innermost one of the fins 106A to 106D, that is, the fin 106A is the smallest in height from the outer periphery of the spoke 105. In other words, the fins 106B to 106d which are located outward in the radial direction of the housing 10 have heights greater than that of the innermost fin 106A.

Usually, the quantity of heat dissipating from the fins 106A to 106D is proportional to the projecting heights of the respective fins 106A to 106D. In other words, the fin 106D which is located outermost in the radial direction of the housing 10 is capable of dissipating a greater quantity of heat as compared with the fins 106A to 106C which are located inside the fin 106D in the radial direction of the housing 10. The increased projecting height of the outside fins 106D enables the height of the inside fins 106A to 106C to be decreased, thereby decreasing the resistance to a flow of the cooling air passing radially inside portions of the inlets 103. This avoids a drop in flow rate of the cooling air passing through the air inlets 103 to ensure a desired cooling ability of the electrical rotating machine 1.

Third Embodiment

Figure 4:
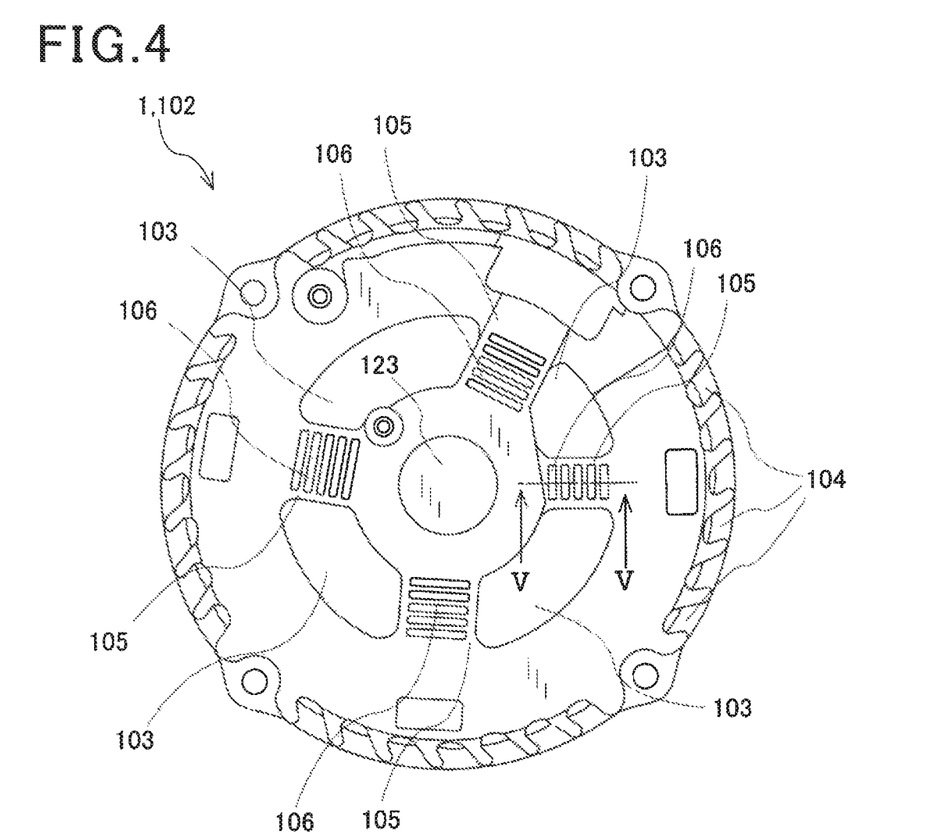
FIG. 4 is a side view which illustrates a structure of a housing of an electrical rotating machine according to the third embodiment.
Figure 5:
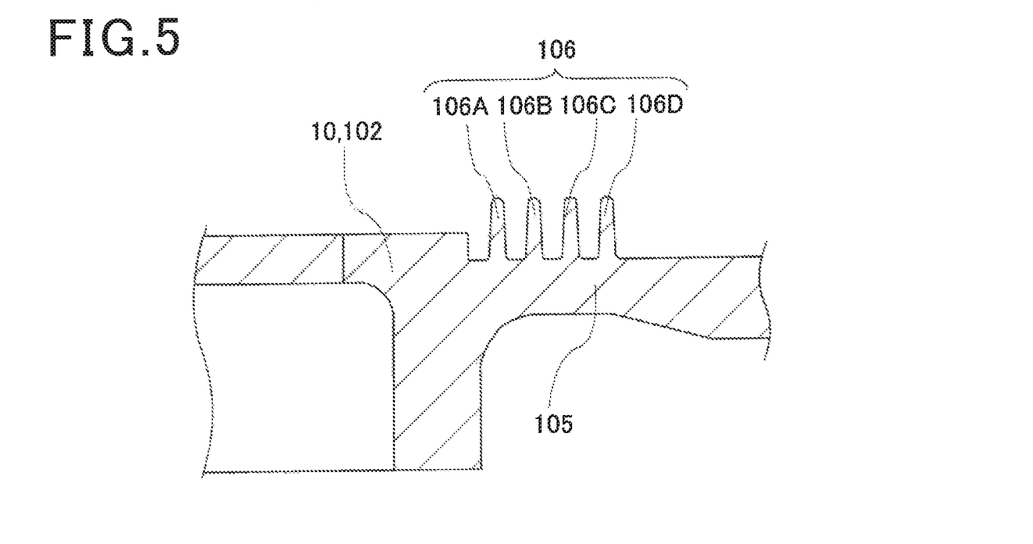
FIG. 5 is a partially sectional view which illustrates heat dissipating fins of a heat sink of the electrical rotating machine of FIG. 4.

The electrical rotating machine 1 of the third embodiment is different only in structure of the heat sinks 106 from the one in the first embodiment. Other arrangements are identical, and explanation thereof in detail will be omitted here. FIG. 4 is a side view which illustrates the heat sinks 106 of the electrical rotating machine 1 in the third embodiment. FIG. 5 is a sectional view, as taken along the line V-V in FIG. 4.

Each of the heat sinks 106 is, as can be seen in FIGS. 4 and 5, disposed on a portion of a periphery of a corresponding one of the spokes 105 which does not directly face the air inlet 103. In other words, the fins 106A to 106D of each of the heat sinks 106 extend substantially parallel to each other from the spoke 105 in the axial direction of the housing 10 (i.e., the rotor 12 or the rotating shaft 123). The fins 106A to 106D are equal in projecting height to each other.

Beneficial Advantages of the Third Embodiment

The structure of the electrical rotating machine 1 offers the following advantage 4 in addition to the advantages 1 to 3, as described above.

Advantage 4

The electrical rotating machine 1 of this embodiment has the fins 106A to 106D of each of the heat sinks 106 which are oriented to extend from the spoke 105 in the axial direction of the electrical rotating machine 1.

In other words, the fins 106A to 106D do not protrude into the air inlet 103, so that the cooling air, as having entered the air inlet 103, is not obstructed by the heat sinks 106. The electrical rotating machine 1 of this embodiment is designed to minimize a drop in flow rate of the cooling air passing through the air inlets 103 to enhance the cooling ability of the electrical rotating machine 1.

Fourth Embodiment

Figure 6:
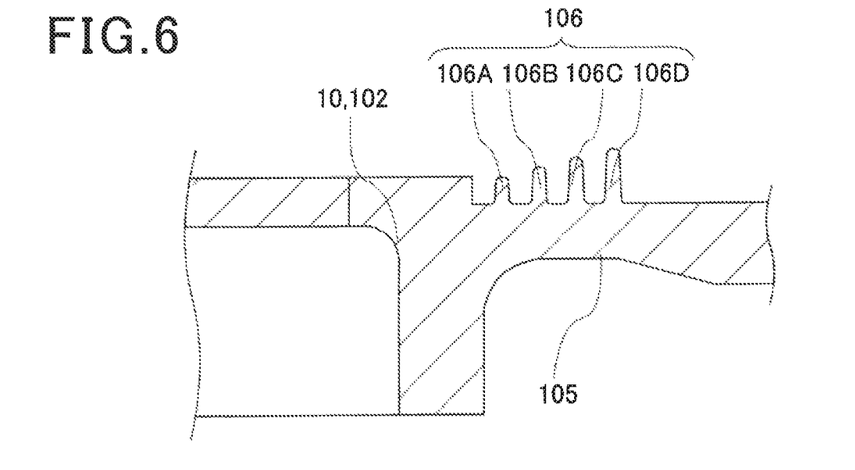
FIG. 6 is a partially sectional view which illustrates heat dissipating fins of a heat sink of an electrical rotating machine according to the fourth embodiment.

The electrical rotating machine 1 of the fourth embodiment is different only in structure of the heat sinks 106 from the one in the third embodiment. Other arrangements are identical, and explanation thereof in detail will be omitted here. FIG. 6 is a side view which illustrates the heat sinks 106 of the electrical rotating machine 1 in the fourth embodiment.

Each of the heat sinks 106 has the fins 106A, 106B, 106C, and 106D which are, as can be seen in FIG. 6, different from each other in projecting height thereof. In this embodiment, the projecting height increases from the fin 106A which is located innermost in the radial direction of the housing 10 to the fin 106D which is located outermost side in the radial direction of the housing 10.

Beneficial Advantages of the Fourth Embodiment

The structure of the electrical rotating machine 1 of this embodiment offers advantages which are substantially the same as advantages 3 and 4, as described above.

Specifically, the electrical rotating machine 1 of this embodiment has the fins 106A to 106d which are different in projecting height from each other. An innermost one of the fins 106A to 106D, that is, the fin 106A is the smallest in height from the outer periphery of the spoke 105. In other words, the fins 106B to 106D which are located outward in the radial direction of the housing 10 have heights greater than that of the innermost fin 106A.

The quantity of heat dissipating from the fins 106A to 106D is proportional to the projecting heights of the respective fins 106A to 106D.

In other words, the fin 106D which is located outermost in the radial direction of the housing 10 is capable of dissipating a greater quantity of heat as compared with the fins 106A to 106C which are located inside the fin 106D in the radial direction of the housing 10. The increased projecting height of the outside fins 106D enables the height of the inside fins 106A to 106C to be decreased, thereby decreasing the resistance to a flow of the cooling air passing radially inside portions of the inlets 103. This avoids a drop in flow rate of the cooling air passing through the air inlets 103 to ensure a desired cooling ability of the electrical rotating machine 1.

Fifth Embodiment

Figure 7:
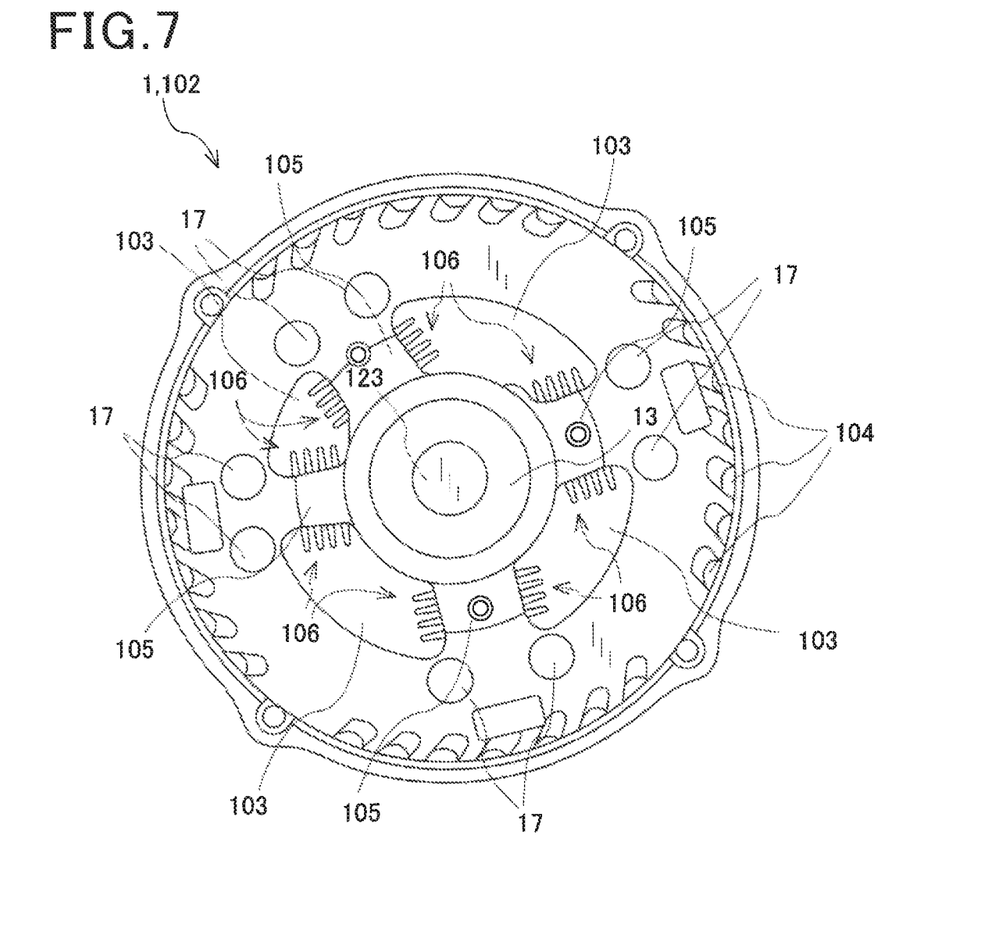
FIG. 7 is a side view which illustrates a structure of a housing of an electrical rotating machine according to the fifth embodiment.

The electrical rotating machine 1 of the fifth embodiment is different from the one in the first embodiment only in that electrical devices 17 are secured to the housing 10. Other arrangements are identical, and explanation thereof in detail will be omitted here. FIG. 7 is a side view which illustrates the layout of the electrical devices 17 and the heat sinks 106 of the electrical rotating machine 1 in the fifth embodiment.

The electrical rotating machine 1, as can be seen in FIG. 7, has the electrical devices 17 mounted on the bottom wall of the rear housing 102 of the housing 10.

Specifically, the housing 10 is connected to the negative pole of the external power supply, so that the housing 10 will be identical in electrical potential with the negative pole, in other words, it serves as an electrical conductive path joined to ground. This enables the electrical devices 17 to be electrically and mechanically joined to the housing 10 without use of a circuit board.

The electrical devices 17 may be any type of electrical devices as long as they can be mounted on the housing 10. For instance, the electrical devices 17 may be implemented by rectifiers or other electrical parts of the controller 2.

The electrical devices 17 are located outside the spokes 105 and the air inlets 103 of the housing 10 (i.e., the rear housing 102) in the radial direction of the housing 10. Specifically, every two or pairs of the electrical devices 17 are secured to areas of the bottom wall of the rear housing 102 which are aligned with respective sides of one of the spokes 105 outside the air inlets 103 in the radial direction of the rear housing 102.

Beneficial Advantages of the Fifth Embodiment

The structure of the electrical rotating machine 1 of this embodiment offers an advantage 5 in addition to the advantages 1 and 2, as described above.

Advantage 5

The electrical rotating machine 1 of this embodiment has the electrical devices 17 secured to the housing 10 outside the spokes 105 in the radial direction of the housing 10.

When the electrical devices 17 (e.g., the rectifiers) produce heat, it will cause the heat to be transmitted directly to the housing 10 and then, like the heat produced by the stator 11, to the rotating shaft 123. Specifically, the heat transfers to the rotating shaft 123 through the spokes 105. The spokes 105 has mounted thereon the heat sinks 106 which work to absorb the heat transferring to the rotating shaft 123.

As apparent from the above discussion, the heat generated by the electrical devices 17 secured to the housing 10 is dissipated by the spokes 105 (i.e., the heat sinks 106). The spokes 105 of the electrical rotating machine 1 of this embodiment define heat conductive paths through which heat generated by both the stator winding 111 and the electrical devices 17 transmit. The fins 106A to 106D of each of the heat sinks 106 are disposed on a respective one of the spokes 105, thereby minimizing the quantity of the heat which is generated by the stator winding 111 and the electrical devices 17 and transmitted to the bearings 13.

Sixth Embodiment

Figure 8:
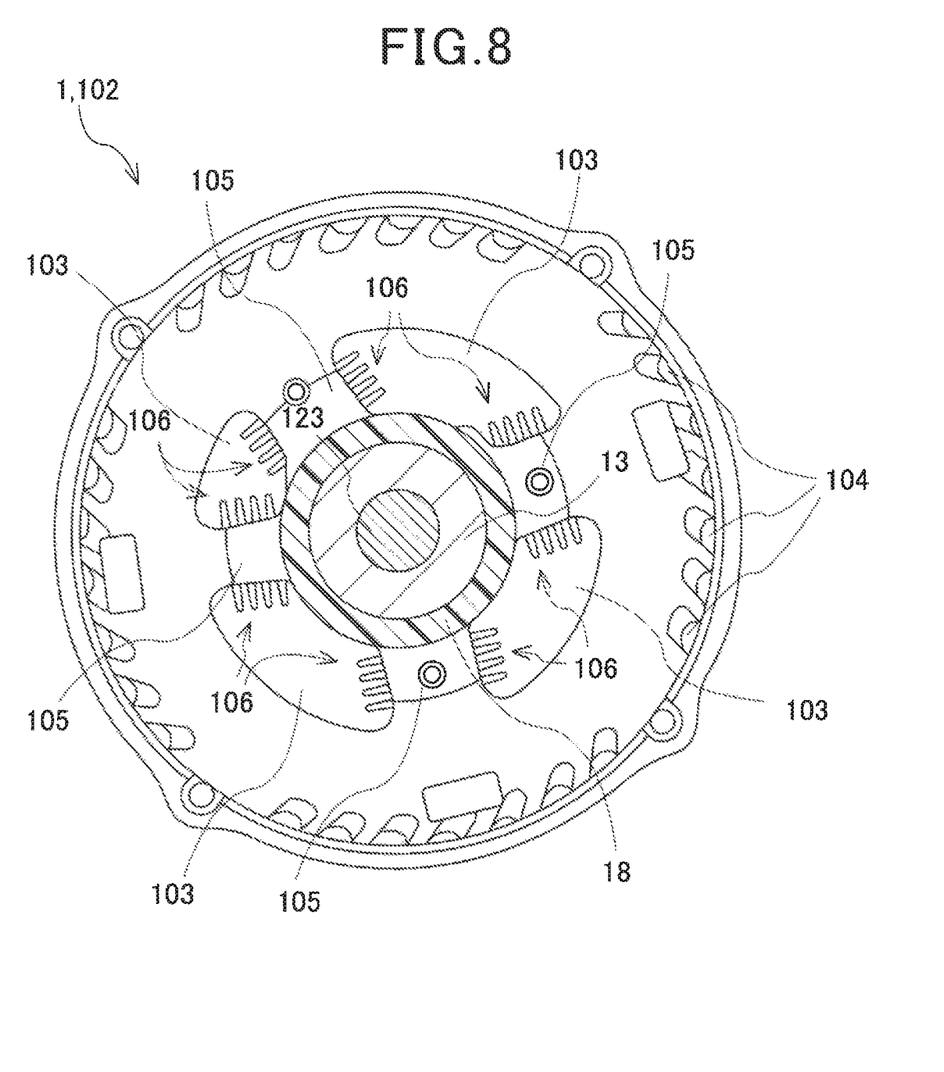
FIG. 8 is a side view which illustrates a structure of a housing of an electrical rotating machine according to the sixth embodiment.

The electrical rotating machine 1 of the sixth embodiment is different in structure of the bearings 13 from the one in the first embodiment. Other arrangements are identical, and explanation thereof in detail will be omitted here. FIG. 8 is a side view which illustrates a cross section of the bearing 13 mounted in the rear housing 102. The front housing 101 may have the same structure as the rear housing 102.

The electrical rotating machine 1 of this embodiment, as illustrated in FIG. 8, has the bearing 13 mounted in the bottom wall of the cylindrical rear housing 102 of the housing 10 to rotatably retain the rotating shaft 123. Specifically, the bearing 13 is secured to the rear housing 102 through a cushioning member 18 serving as a mechanical damper. The front housing 101 may be designed to have such a structure.

The cushioning member 18 is made of a resinous hollow cylinder which defines a circular bearing housing in which bearing 13 is fit. The cushioning member 18 is shaped to surround or cover an outer circumferential surface of an outer race of the bearing 13 and has formed therein a central chamber (i.e., the bearing housing) in which the bearing 13 is, for example, press-fit.

The cushioning member 18 retains the bearing 13 on the housing 10 and is made of, for example, a heat-resistant resin which serves to absorb a change in volume of at least one of the bearing 13 and the housing 10 which arises from, for example, thermal expansion thereof. The resin from which the cushioning member 18 is made is lower in thermal conductivity than metal from which the housing 10 is made, thus serving as a thermal insulator to minimize transfer of heat between the bearing 13 and the housing 10.

The cushioning member 18 is, as described above, made of a substantially hollow circular cylinder which covers only the outer circumference of the bearing 13, but however, may alternatively be shaped to cover axially-opposed ends of the bearing 13 as well as the outer circumference.

Beneficial Advantages of the Sixth Embodiment

The structure of the electrical rotating machine 1 of this embodiment offers an advantage 6 in addition to the advantages 1 and 2, as described above.

Advantage 6

The electrical rotating machine 1 of the sixth embodiment, as described above, has the cushioning member 18 which is secured to the housing 10 (e.g., the spokes 105) to retain the bearing 13 between itself and the housing 10 and works to absorb a thermal change in volume of the bearing 13 or the housing 10.

The heat conducting through the housing 10 will induces thermal expansion of at least one of the bearing 13 and the housing 10, thus resulting in a change in volume thereof. The cushioning member 18 functions to absorb such a volume change and ensures the stability in operation of the bearing 13 if, for example, the volume of the housing 10 changes.

The cushioning member 18 works to block the transfer of heat between the bearing 13 and the housing 10 and also absorb heat, as generated by the bearing 13, to minimize a change in volume of the bearing 13.

The electrical rotating machine 1 may be engineered to have all possible combinations of the features of the above embodiments.

The above discussion has referred only to the structure of the rear housing 102 using FIGS. 2 to 8 for the brevity of disclosure, but however, the front housing 101 may be designed to have substantially the same structure as that of the rear housing 102, that is, be identical in structures of the air inlets 103, the bearing housing 250, and/or the spokes 105 with those in the rear housing 102.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. An electrical rotating machine comprising:
a rotor which has a rotor winding and creates magnetic poles upon energization thereof;
a stator which is disposed to face the rotor;
a housing which retains the rotor and the stator therein;
a bearing through which the rotor is retained by the housing to be rotatable;
a plurality of air inlets which are formed in a wall of the housing and through which cooling air enters the housing to cool the bearing;
a plurality of air outlets which are formed in the wall of the housing and through which the cooling air is discharged outside the housing;
a plurality of spokes which extend in a radial direction of the housing to define the air inlets in the wall of the housing and isolate the air inlets from each other in a circumferential direction of the housing; and
heat sinks, each of which is equipped with fins, the fins of each of the heat sinks protruding in an axial direction of the rotor from a surface of a respective one of the spokes, wherein
the surface has a plane that is perpendicular to the axial direction of the rotor, and
the fins axially extend in a direction that is parallel to the axial direction.

2. The electrical rotating machine as set forth in claim 1, wherein the fins of each of the heat sinks include an outer fin and an inner fin which is located inside the outer fin in a radial direction of the housing, and wherein the outer fin has a height protruding from the spoke which is greater than or equal to a height of the inner fin.

3. The electrical rotating machine as set forth in claim 1, wherein the bearing is secured to the housing through a cushioning member configured to absorb a change in volume of at least one of the bearing and the housing which arises from thermal expansion thereof.

4. The electrical rotating machine as set forth in claim 1, wherein each of the fins of the heat sinks has opposed major surfaces which are exposed to one of the air inlets and extend parallel to a flow of the cooling air entering the air inlet.

5. The electrical rotating machine as set forth in claim 1, wherein each of the spokes extends from the bearing and is exposed to a flow of the cooling air entering a corresponding one of the air inlet to minimize transfer of heat from the housing to the bearing.

6. An electrical rotating machine comprising:
a rotor which has a rotor winding and creates magnetic poles upon energization thereof;
a stator which is disposed to face the rotor;
a housing which retains the rotor and the stator therein;
a bearing through which the rotor is retained by the housing to be rotatable;
a plurality of air inlets which are formed in a wall of the housing and through which cooling air enters the housing to cool the bearing;
a plurality of air outlets which are formed in the wall of the housing and through which the cooling air is discharged outside the housing after cooling the bearing;
a plurality of spokes which extend in a radial direction of the housing to define the air inlets in the wall of the housing and isolate the air inlets from each other in a circumferential direction of the housing; and
heat sinks each of which is equipped with fins, each of the heat sinks being disposed on a respective one of the spokes, the fins of each of the heat sinks protruding inward into a corresponding one of the air inlets from a corresponding one of the spokes in a direction perpendicular to a length of the spoke, the fins of each of the heat sinks including an outer fin and an inner fin which is located inside the outer fin in a radial direction of the housing, the outer fin having a height protruding from the spoke which is greater than a height of the inner fin.

7. An electrical rotating machine comprising:
a rotor which has a rotor winding and creates magnetic poles upon energization thereof;
a stator which is disposed to face the rotor;
a housing which retains the rotor and the stator therein;
a bearing through which the rotor is retained by the housing to be rotatable;
a plurality of air inlets which are formed in a wall of the housing and through which cooling air enters the housing to cool the bearing;
a plurality of air outlets which are formed in the wall of the housing and through which the cooling air is discharged outside the housing after cooling the bearing;
a plurality of spokes which extend in a radial direction of the housing to define the air inlets in the wall of the housing and isolate the air inlets from each other in a circumferential direction of the housing; and
heat sinks each of which is equipped with fins, each of the heat sinks being disposed on a respective one of the spokes, the fins of each of the heat sinks protruding from a respective one of the spokes, and the fins of each of the heat sinks protruding inward into a corresponding one of the air inlets from a corresponding one of the spokes in a direction perpendicular to a length of the spoke,
wherein the housing has disposed thereon an electrical device which is located outside one of the spokes in a radial direction of the housing.

8. The electrical rotating machine as set forth in claim 7, wherein the electrical device is located closer to the air inlets than to the air outlets.

9. The electrical rotating machine as set forth in claim 7, wherein the housing includes a front housing which is of a hollow cylindrical shape with a bottom and a rear housing which is of a hollow cylindrical shape with a bottom, and wherein the rear housing has the air outlets formed in a side wall thereof and also has the air inlets formed in a bottom wall thereof, the electrical device being mounted on the bottom wall of the rear housing.

10. An electrical rotating machine comprising:
a rotor which has a rotor winding and creates magnetic poles upon energization thereof;
a stator which is disposed to face the rotor;
a housing which retains the rotor and the stator therein;
a bearing through which the rotor is retained by the housing to be rotatable;
a plurality of air inlets which are formed in a wall of the housing and through which cooling air enters the housing to cool the bearing;
a plurality of air outlets which are formed in the wall of the housing and through which the cooling air is discharged outside the housing after cooling the bearing;
a plurality of spokes which extend in a radial direction of the housing to define the air inlets in the wall of the housing and isolate the air inlets from each other in a circumferential direction of the housing; and
heat sinks, each of which is equipped with fins, each of the heat sinks being disposed on a respective one of the spokes, the fins of each of the heat sinks protruding from a respective one of the spokes, and the fins of each of the heat sinks protruding in an axial direction of the rotor from a surface of a respective one of the spokes,
wherein the housing has disposed thereon an electrical device which is located outside one of the spokes in a radial direction of the housing.

11. The electrical rotating machine as set forth in claim 10, wherein the electrical device is located closer to the air inlets than to the air outlets.

12. The electrical rotating machine as set forth in claim 10, wherein the housing includes a front housing which is of a hollow cylindrical shape with a bottom and a rear housing which is of a hollow cylindrical shape with a bottom, and wherein the rear housing has the air outlets formed in a side wall thereof and also has the air inlets formed in a bottom wall thereof, the electrical device being mounted on the bottom wall of the rear housing.

13. The electrical rotating machine as set forth in claim 6, wherein the bearing is secured to the housing through a cushioning member configured to absorb a change in volume of at least one of the bearing and the housing which arises from thermal expansion thereof.

14. The electrical rotating machine as set forth in claim 6, wherein each of the fins of the heat sinks has opposed major surfaces which are exposed to one of the air inlets and extend parallel to a flow of the cooling air entering the air inlet.

15. The electrical rotating machine as set forth in claim 6, wherein each of the spokes extends from the bearing and is exposed to a flow of the cooling air entering a corresponding one of the air inlet to minimize transfer of heat from the housing to the bearing.

* * * * *